US008042624B2

(12) United States Patent
Quernheim et al.

(10) Patent No.: US 8,042,624 B2
(45) Date of Patent: Oct. 25, 2011

(54) SYSTEM AND METHOD FOR IMPROVED DEPTH MEASUREMENT CORRECTION

(75) Inventors: Lars Quernheim, Lower Saxony (DE);
Dmitriy Dashevskiy, Nienhagen (DE);
John D. Macpherson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 373 days.

(21) Appl. No.: 12/423,402

(22) Filed: Apr. 14, 2009

(65) Prior Publication Data

US 2009/0283323 A1     Nov. 19, 2009

Related U.S. Application Data

(60) Provisional application No. 61/045,653, filed on Apr. 17, 2008.

(51) Int. Cl.
*E21B 47/04* (2006.01)
*G06G 7/48* (2006.01)
*G01V 5/04* (2006.01)

(52) U.S. Cl. ................. 175/40; 702/9; 703/10
(58) Field of Classification Search .......... 175/40, 175/48; 702/9; 703/10
See application file for complete search history.

(56) References Cited

U.S. PATENT DOCUMENTS

| | | |
|---|---|---|
| 4,903,245 A | 2/1990 | Close et al. |
| 5,448,911 A | 9/1995 | Mason |
| 2005/0197777 A1 | 9/2005 | Rodney et al. |
| 2005/0200498 A1 | 9/2005 | Gleitman |
| 2005/0284661 A1 | 12/2005 | Goldman et al. |

FOREIGN PATENT DOCUMENTS

| | | |
|---|---|---|
| EP | 1806473 A1 | 1/2006 |
| GB | 2216661 | 10/1989 |
| GB | 2396697 A | 6/2004 |
| WO | 2004074625 A1 | 9/2004 |
| WO | 2005033473 A1 | 4/2005 |
| WO | 2008036790 A2 | 3/2008 |

OTHER PUBLICATIONS

Notification Concerning Transmittal of International Preliminary Report on Patentability and Written Opinon of the Interntional Searching Authority for International Application No. PCT/US2009/040954. Mailed Oct. 28, 2010.
Heisig et al., "Lateral Drillstring Vibrations in Extended-Reach Wells", IADC/SPE 59235, Society of Petroleum Engineers, New Orleans, LA, Feb. 2000, 11 pages.
Wilson et al., "Depth Control: Reconciliation of LWD and Wireline Depths, Standard Practice and an Alternative Simple but Effective Method", SPE 89899, Society of Petroleum Engineers, Houston, TX, Sep. 2004, 11 pages.
Dashevskiy et al., "Dynamic Depth Correction to Reduce Depth Uncertainty and Improve MWD/LWD Log Quality", SPE 103094, Society of Petroleum Engineers, San Antonio, TX, Sep. 2006, 12 pages.

*Primary Examiner* — William P Neuder
(74) *Attorney, Agent, or Firm* — Cantor Colburn LLP

(57) ABSTRACT

A method for generating corrected geologic depth information is disclosed. The method includes: estimating a depth of each of a plurality of different locations along a length of a drillstring disposed in a borehole; measuring at least one environmental factor at each of the plurality of different locations and determining a deformation of the drillstring at each of the plurality of different locations from the measured environmental factor; and generating a non-linear model of the deformation along the length relative to a reference point. A system and computer program product for generating corrected geologic depth information is also disclosed.

20 Claims, 2 Drawing Sheets

SYSTEM AND METHOD FOR IMPROVED DEPTH MEASUREMENT CORRECTION

CROSS REFERENCE TO RELATED APPLICATIONS

Under 35 U.S.C. §119(e), this application claims the benefit of U.S. Provisional Application No. 61/045,653, filed Apr. 17, 2008, the entire disclosure of which is incorporated herein by reference.

BACKGROUND

Various tools are used in hydrocarbon exploration and production to measure properties of geologic formations during or shortly after the excavation of a borehole. The properties are measured by formation evaluation (FE) tools and other suitable devices, which are typically integrated into a bottomhole assembly. Sensors are used in the FE tools to monitor various downhole conditions and formation characteristics.

It is important that sensor information data be correlated with associated depths to provide an accurate representation of the formation. True vertical depth (TVD) is the vertical distance between a downhole location and the surface, and is useful in associating with various measurement data.

Numerous techniques for measuring TVD have been utilized. Depth measurements may be estimated by measuring the length of a drillstring of a formation evaluation/exploration system. However, various environmental factors may cause the drillstring to be stretched or shortened, such as load changes, friction phenomena and thermal influences on the drillstring, so that additional measurement data is required to calculate TVD. Significant factors for an elongation of drill pipe are drill pipe stretch and thermal expansion, and thus measurement of these factors is important to increase the accuracy in depth correction and associated TVD calculations.

The measured depth of a downhole tool is normally an estimation based on an assumed stiff and inelastic drill pipe, which is corrected by measurement and drill string model data. Such drillstring models provide information about the elongation of the drill pipe caused by load changes, thermal influences or other environmental factors. Normally parameters to calibrate these models are measured only on the surface and/or at one point downhole (in a BHA) and linear distribution of the environmental factors is assumed along the length of the drillstring and/or TVD. These models do not take into account changes or fluctuations in such factors along the length of the drillstring, and thus do not provide a completely accurate representation of the effects of such factors.

BRIEF DESCRIPTION OF THE INVENTION

A method for generating corrected geologic depth information includes: estimating a depth of each of a plurality of different locations along a length of a drillstring disposed in a borehole; measuring at least one environmental factor at each of the plurality of different locations and determining a deformation of the drillstring at each of the plurality of different locations from the measured environmental factor; and generating a non-linear model of the deformation along the length relative to a reference point.

A system for generating corrected geologic depth information includes: a drillstring in operable communication with a downhole device, and configured to be disposed in a borehole; a plurality of sensors disposed at different locations along a length of the drillstring, each of the plurality of sensors configured to measure at least one environmental factor on the drillstring at an associated location; and a processor for determining a deformation of the drillstring at each location from the measured environmental factor, and generating a non-linear model of the deformation along the length relative to a reference point.

A computer program product is stored on machine readable media for generating corrected geologic depth information by executing machine implemented instructions. The instructions perform: estimating a depth of each of a plurality of different locations along a length of a drillstring disposed in a borehole; measuring at least one environmental factor at each of the plurality of different locations and determining a deformation of the drillstring at each of the plurality of different locations from the measured environmental factor; and generating a non-linear model of the deformation along the length relative to a reference point.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

There is provided a system and method for calculating a depth, e.g., a true vertical depth (TVD) of a downhole tool. Such depth measurement includes using distributed sensor information to evaluate TVD using appropriate depth correction models. In one embodiment, the method includes measuring non-linear environmental factors along a drillstring from the distributed sensors. Environmental factors include, for example, temperature of the drillstring and stress on the drillstring. The method thus includes determining a distribution of environmental factors along the length of the drillstring, which may be non-linear or have a non-linear effect on the length of the drillstring. In another embodiment, the distribution may be calculated in reference to one or more reference points which are located at any of various points along the length of the drillstring.

A detailed description of one or more embodiments of the disclosed system and method are presented herein by way of exemplification and not limitation with reference to the Figures.

Figure 1:
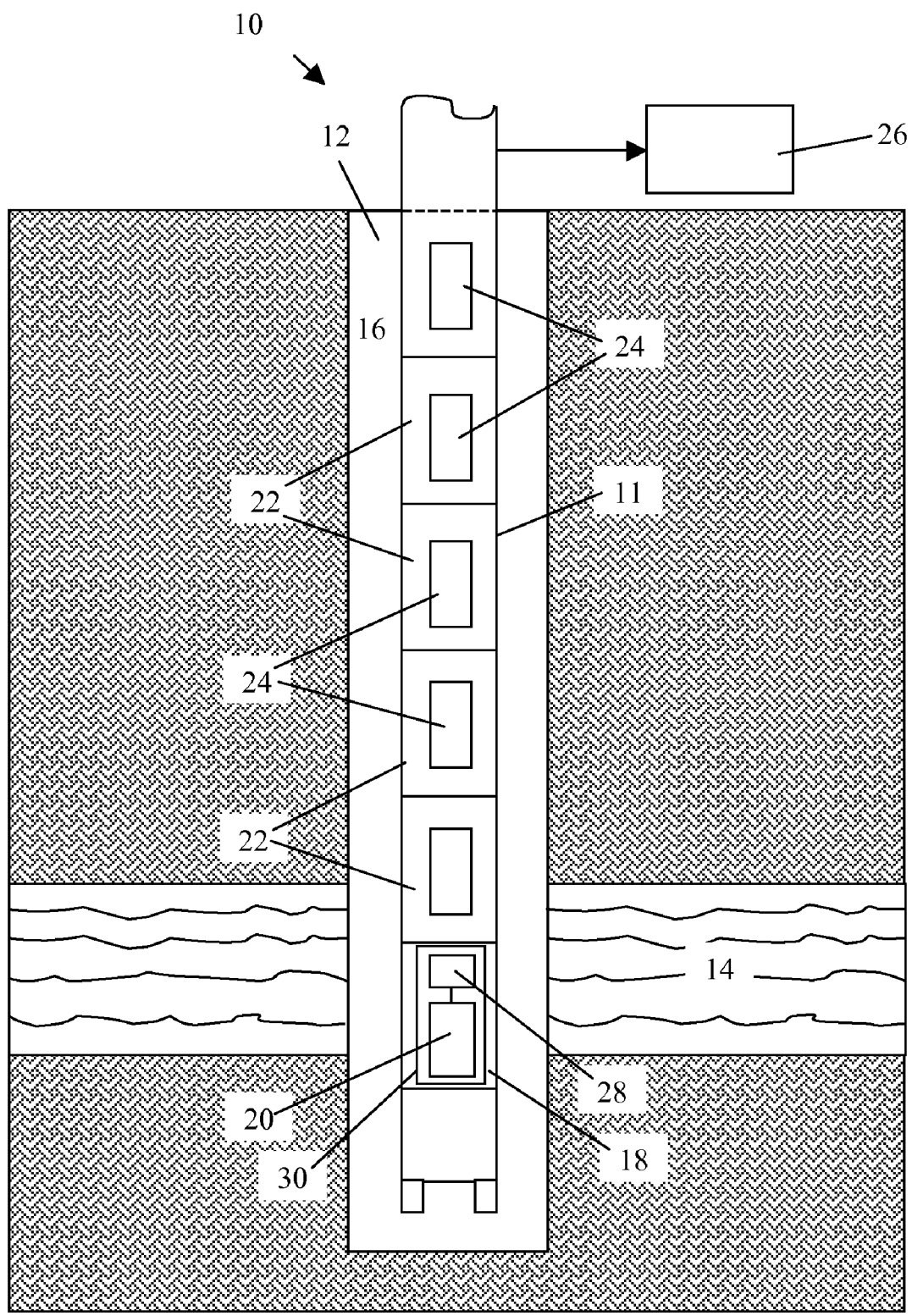
FIG. 1 depicts an embodiment of a well logging apparatus.

Referring to FIG. 1, an exemplary embodiment of a well logging system 10 includes a drillstring 11 that is shown disposed in a borehole 12 that penetrates at least one earth formation 14 for making measurements of properties of the formation 14 and/or the borehole 12 downhole. Drilling fluid, or drilling mud 16 may be pumped through the borehole 12. As described herein, "formations" refer to the various features and materials that may be encountered in a subsurface environment. Accordingly, it should be considered that while the term "formation" generally refers to geologic formations of interest, that the term "formations," as used herein, may, in some instances, include any geologic points or volumes of interest (such as a survey area). In addition, it should be noted that "drillstring" as used herein, refers to any structure suitable for lowering a tool through a borehole or connecting a drill to the surface, and is not limited to the structure and configuration described herein.

Examples of logging processes that can be performed by the system 10 include measurement-while-drilling (MWD) and logging-while-drilling (LWD) processes, during which measurements of properties of the formations and/or the borehole are taken downhole during or shortly after drilling. The data retrieved during these processes may be transmitted to the surface, and may also be stored with the downhole tool for later retrieval. Other examples include logging measurements after drilling, wireline logging, and drop shot logging.

A downhole formation evaluation (FE) tool 18 may be disposed in the well logging system 10 at or near the downhole portion of the drillstring 11. FE tools provide for the measurement versus depth and/or time of one or more physical quantities in or around a borehole. The taking of these measurements is referred to as "logging", and a record of such measurements is referred to as a "log". Many types of measurements are made to obtain information about the geologic formations. Some examples of the measurements include gamma ray logs, nuclear magnetic resonance logs, neutron logs, resistivity logs, and sonic or acoustic logs.

The downhole tool 18, in one embodiment, includes one or more sensors or receivers 20 to measure various properties of the formation 14 as the tool 18 is lowered down the borehole 12. Such sensors 20 include, for example, nuclear magnetic resonance (NMR) sensors, resistivity sensors, porosity sensors, gamma ray sensors, seismic receivers and others.

The drillstring 11 includes a plurality of sections 22. Sections 22 may be separate pipe sections connected together, or may be selected portions of a selected length of the drillstring 11. Thus, the drillstring 11 may be a single length, such as a single hollow pipe, or may consist of a plurality of distinct pipe sections held together to form the drillstring 11. In one embodiment, the plurality of sections 22 are each defined by a distinct pipe section.

In one embodiment, a plurality of distributed sensors 24 are disposed on the drillstring 11 and distributed along at least a portion of the length of the drillstring 11. As used herein, "distributed sensors" refer to at least two sensors, each of which are positioned at a different location along a selected length of the drillstring 11. In one embodiment, the plurality of sensors 24 are positioned at least substantially equidistantly. In another embodiment, each sensor 24 is positioned in a different section 22. The number of sensors 24 is not limited, and the sensors 24 may be configured in any desired way.

The number of sensors 24, in one embodiment, is selected based on a length of the drillstring 11 (or based on a length of the drillstring from a reference point to a downhole location, such as the location of the tool 18) and a desired resolution. An increase in the number of sensors 24 may increase the resolution of a resulting model, allowing for improved results, an improved non-linear model, and accordingly a more precise correction of measured depth.

Each of the sensors 24 may be a single sensor or multiple sensors located at a single location. In one embodiment, one or more of the sensors includes multiple sensors located proximate to one another and assigned a specific location on the drillstring. Furthermore, in other embodiments, each sensor 24 includes additional components, such as clocks, memory processors, etc.

The sensors 24 may be of any type suitable to measure environmental factors on the drillstring 11. In one embodiment, each sensor 24 is configured to measure one or more environmental factors that result in a change in the length of the drillstring 11, such as friction phenomena, temperature, bending stresses, load changes, and others. Accordingly, exemplary sensors 24 include temperature sensors, and force, stress and/or strain gauges.

In one embodiment, instead of defining a fixed reference point (such as a surface location) and measuring the height of the drill block to determine an estimated depth, the distributed sensors 24 may be used to define additional reference points along the wellbore 12 and/or the drillstring 11. Significant measurement characteristics may be chosen arbitrarily as a reference from which the true vertical depth is calculated. Accordingly, depth correction is not limited to correction of depth relative to a reference point on a drill rig or other surface location.

In one embodiment, each of the sensors 24 are connected by a bus or other communication connection, and may be ultimately in communication with a surface processing unit 26, the tool 18, or any other location.

The tool 18 and/or the distributed sensors 24 may be equipped with transmission equipment to communicate ultimately to the surface processing unit 26. Such transmission equipment may take any desired form, and different transmission media and methods may be used. Examples of connections include wired, fiber optic, wireless connections or mud pulse telemetry.

The surface processing unit 26 also includes components as necessary to provide for processing of data from the tool 18 and/or the distributed sensors 24. Exemplary components include, without limitation, at least one processor, storage, memory, input devices, output devices and the like. The surface processing unit 26 optionally is configured to control the tool 18 and/or the distributed sensors 26.

In one embodiment, the tool 18 also includes a downhole clock 28 or other time measurement device for indicating a time at which each measurement was taken by the sensor 20. The sensor 20 and the downhole clock 28 may be included in a common housing 30. With respect to the teachings herein, the housing 30 may represent any structure used to support at least one of the sensor 20, the downhole clock 28, and other components.

Figure 2:
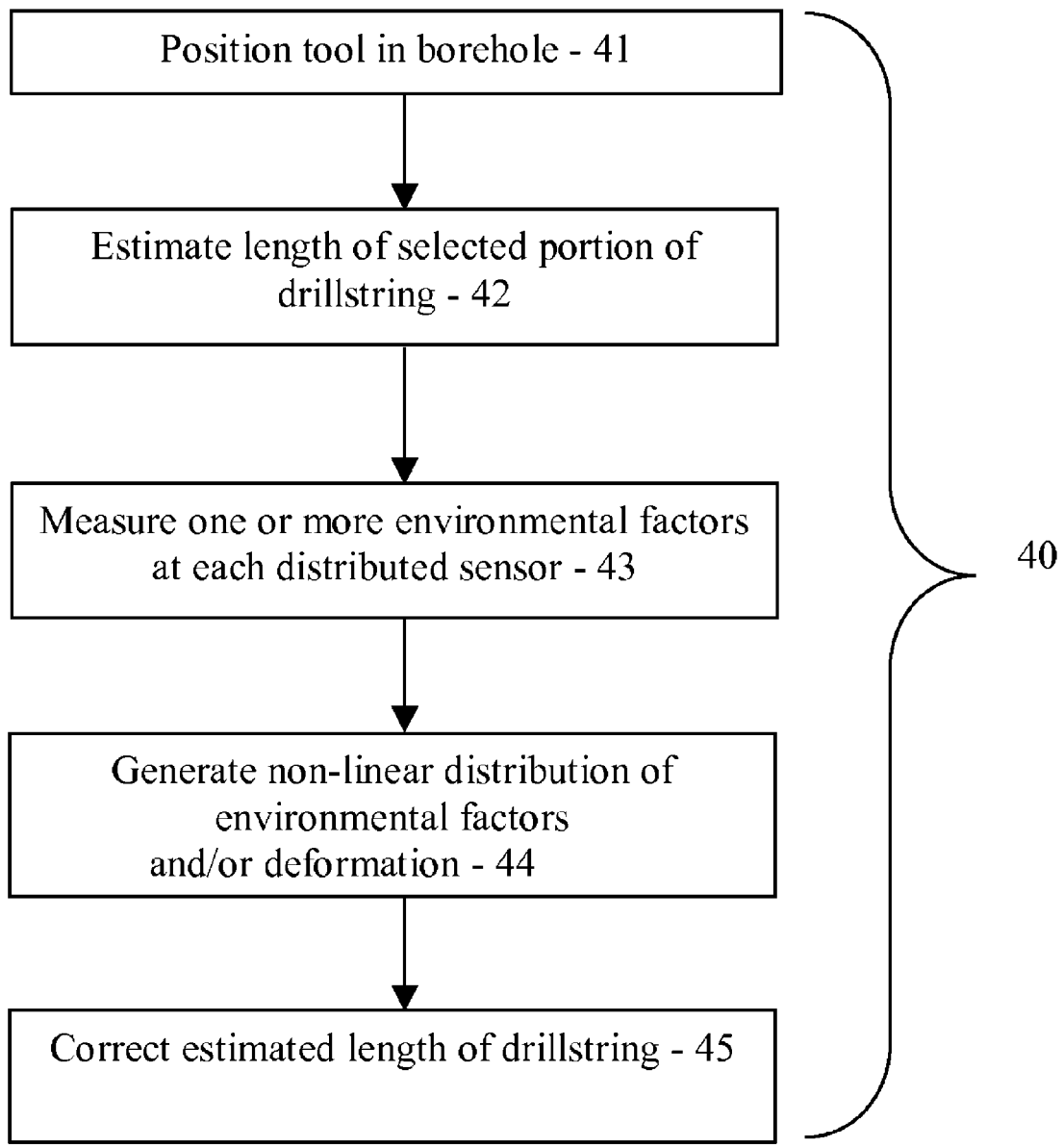
FIG. 2 is a flow chart providing an exemplary method for determining a depth of a downhole tool.

FIG. 2 illustrates a method 40 for calculating a depth of a downhole tool or other component of a formation evaluation/exploration system, such as a tool used in conjunction with a drillstring to perform a downhole measurement. The method 40 includes one or more stages 41, 42, 43, 44 and 45. The method 40 is described herein in conjunction with the drillstring 11, the distributed sensors 24 and the downhole tool 18, although the method 40 may be performed in conjunction with any number and configuration of sensors and tools, as well as any device for lowering the tool and/or drilling a borehole. The method 40 may be performed by one or more processors or other devices capable of receiving and processing measurement data. In one embodiment, the method includes the execution of all of stages 41, 42, 43, 44 and 45 in the order described. However, certain stages may be omitted, stages may be added, or the order of the stages changed.

In the first stage 41, the drillstring 11 and the tool 18 are positioned at a depth of the geologic formation 14. Positioning may include lowering the tool 18 during or after drilling of the borehole 12.

In the second stage 42, the length of a selected portion of the drillstring 11 is estimated. In one embodiment, such estimation includes an estimation of the length of the drillstring 11 between a reference point, such as a surface location, on the drillstring 11 and a downhole location. In one embodiment, the downhole location is the location of the tool 18.

In one embodiment, calculating the estimated length includes measuring the length of the selected portion of the drillstring 11 prior to lowering the tool, i.e., when the drillstring is in an undeformed state. In one embodiment, a length is measured between the tool 18 and the sensor 24 closest to the tool 18, and a length between each sensor 24 is measured. In other embodiments, any number of reference points is selected and measured relative to one another and/or to the downhole tool.

In one embodiment, the estimated length is calculated by noting the position of a sensor 24 or other reference point, and calculating the estimated length of the selected portion based on the previous measurements.

In the third stage 43, one or more environmental factors are measured by a plurality of the sensors 24 located along the selected portion of the drillstring 11. This portion may include, for example, the portion of the drillstring 11 between a selected reference point and the tool 18, or any other length of the drillstring 11. The reference point may be a point located at a surface portion of the drillstring 11, or may be disposed at any selected location along the length of the drillstring 11.

In one embodiment, properties of the formation 14 and/or the borehole 12 may also be measured via the sensor 20 of the tool 18. Such measurements may be performed at any time, such as during drilling, during lowering of the tool 18, and after lowering the tool. Measurement of the properties need not be performed at the same time as measurement of environmental factors on the drillstring 11. In one embodiment, both environmental factors and properties are measured while the tool 18 is at a single depth, although the measurements may not coincide in time.

In the fourth stage 44, a non-linear distribution of the environmental factors and/or deformation along the selected length is calculated. In one embodiment, a model for calculating the effects of the environmental factor on the drillstring 11 is selected. Estimated length data of the selected portion, as well as environmental data from each sensor along that portion, is inputted into the model. The model provides information on the effect of the environmental factors on the length of the drillstring 11 at various points along the length, and thus provides a distributed, non-linear model.

In one embodiment, the model calculates the effect of the environmental factor at each sensor 24 location, and determines a change in length, i.e., deformation along the length of the drillstring, at that location based on each individual sensor 24 measurement. In another embodiment, deformation measurements are received from each sensor 24, which are in the form of strain gauges, for example, and the model determines a change in length at each location.

For example, the model may perform a non-linear interpolation, such as a spline interpolation or a polynomial interpolation. In other embodiments, a non-linear interpolation is performed between two or more sensors that define the selected length of the drillstring 11. In yet other embodiments, the model may be a non-linear "physical" model, i.e., a model that simulates changes in physical characteristics or parameters of the drillstring 11 along its length.

In another embodiment, the model determines a section associated with each sensor 24, or a selected section of the drillstring 11 is associated with each sensor 24 and inputted into the model. In this embodiment, the sensor location includes the selected section associated with that sensor. The model then calculates, based on the environmental data for that sensor, the change in length over that section. In this way, a plurality of section models are generated and form the overall non-linear model. In other embodiments, each section may include a plurality of sensors 24.

Such section models may include a linear section model generated for the section. In other embodiments, the section models generated are each non-linear section models. For example, a non-linear interpolation is performed between two or more sensors that define the section. In other examples, each section model may be a non-linear "physical" model, i.e., a model that simulates changes in physical characteristics or parameters of the drillstring 11 along the selected section. In yet other examples, the section model may be a non-linear TVD model. The non-linear model may then be fit to a set of measurements taken along the drillstring 11 or the TVD. Effectively, a model may thus be created between as few as two measurement points.

As referred to herein, the term "model" refers to any simulation or representation of environmental factors along a selected length of the drillstring 11, or any collection of data representing environmental factors and/or deformation and associated with a location on the drillstring 11. The model is presented, for example, visually or textually, and associates environmental factors and/or deformation with various locations along the selected length of the drillstring 11. The model may be a computer simulation, a computer model, or any other mechanism to generate non-linear environmental factor and/or deformation data for the selected length of the drillstring 11.

In the fifth stage 45, the estimated length of the selected portion of the drillstring 11 is corrected based on the model to generate a corrected depth of each location, e.g., by calculating the cumulative change in depth along the drillstring 11 for every location in the selected portion. The model calculates the corrected depth of each location from an inputted reference location that includes a surface location or other location along the length of the drillstring 11.

In one embodiment, the corrected depth is used to determine the true vertical depth (TVD) of the downhole tool 18. In this embodiment, the model determines the TVD by applying the deformation information for each location, and determines therefor the corrected depth between a reference point and each location. From this information, the TVD of any location on the drillstring 11, is calculated based on the corrected depth. In some embodiments, the TVD corresponds to the corrected depth. In other embodiments, such as those in which the drillstring 11 follows an inclined path, the TVD is calculated from the corrected length and a trajectory of the drillstring 11. This calculation may be performed by the model, or independently via a separate processor.

The above method 40 may be performed continuously or intermittently as desired. As the depth of the tool 18 changes, environmental data may be taken from each sensor 24 along the selected portion of the drillstring and inputted into the model to obtain an updated TVD for various depths and/or while the tool 18 is being lowered.

The systems and methods described herein provide various advantages over prior art techniques. One such advantage is that the system and method determine a non-linear distribution of environmental factors, and resulting deformation, in contrast to prior art techniques that assume a linear distribution, and can therefore provide a much more accurate model of the actual changes in length of the drillstring. For example, having distributed measurements along the drillstring allows for more accurate estimation of where in the drillstring buckling occurs, so that this can be taken into account for depth computations. Thus, the systems and methods described herein can be used to measure a TVD with greater accuracy than prior art techniques, by taking into account non-linear temperature, pressure, mud density and stress distributions along a drillstring. Furthermore, the systems and methods described herein allow for the arbitrary selection of reference points along the length of the drillstring, and are thus not limited to measuring true vertical depth in reference to a surface location, in contrast to prior art techniques.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for generating corrected geologic depth information, the method comprising:
   estimating a depth of each of a plurality of different locations along a length of a drillstring disposed in a borehole;
   measuring at least one environmental factor at each of the plurality of different locations and determining a deformation of the drillstring at each of the plurality of different locations from the measured environmental factor; and
   generating a non-linear model of the deformation along the length relative to a reference point.

2. The method of claim 1, further comprising correcting the estimated depth of each location to generate a true vertical depth of each location.

3. The method of claim 1, wherein estimating the depth includes measuring a distance between each location and the reference point prior to disposing the drillstring in the borehole.

4. The method of claim 3, wherein the reference point is a position along the length selected from: a surface location and a downhole location along the length.

5. The method of claim 1, wherein the environmental factor is at least one of a temperature, a stress, a strain, a pressure and a mud density.

6. The method of claim 1, wherein the non-linear model describes changes in length of the drill string due to the at least one environmental factor.

7. The method of claim 1, wherein the non-linear model provides a distribution of the environmental factor along the length of the drillstring.

8. The method of claim 1, wherein generating the non-linear model includes:
   identifying a plurality of sections in the length of the drillstring, each of the plurality of sections having at least one of the plurality of different locations, generating a plurality of models, each model associated with a respective section, and incorporating the plurality of models into the non-linear model of the length of the drill string.

9. The method of claim 1, wherein generating the non-linear model includes identifying a known depth of each of the plurality of different locations, measuring the at least one environmental factor at each location, and individually adjusting the depth of each location based on the measured environmental factors.

10. A system for generating corrected geologic depth information, the system comprising:
    a drillstring in operable communication with a downhole device, and configured to be disposed in a borehole;
    a plurality of sensors disposed at different locations along a length of the drillstring, each of the plurality of sensors configured to measure at least one environmental factor on the drillstring at an associated location; and
    a processor for determining a deformation of the drillstring at each location from the measured environmental factor, and generating a non-linear model of the deformation along the length relative to a reference point.

11. The system of claim 10, wherein the processor calculates a depth of the downhole device by correcting an estimated depth based on the model.

12. The system of claim 11, wherein the estimated depth is a distance between the downhole device and the reference point prior to disposing the drillstring in the borehole.

13. The system of claim 10, wherein the reference point is a position along the length selected from: a surface location and a selected location along the length.

14. The system of claim 10, wherein the environmental factor is at least one of a thermal influence, a stress, a strain, a pressure and a mud density.

15. The system of claim 10, wherein the non-linear model describes changes in length of the drill string due to the at least one environmental factor.

16. The system of claim 10, wherein the non-linear model provides a distribution of the environmental factor along the length of the drillstring.

17. The system of claim 10, wherein generating the non-linear model includes:

identifying a plurality of sections in the length of the drillstring, each of the plurality of sections having at least one sensor, and generating a plurality of models, each model associated with a respective section, and incorporating the plurality of models into the non-linear model of the length of the drillstring.

18. The system of claim 10, wherein generating the non-linear model includes identifying an estimated depth of each sensor, measuring the at least one environmental factor at each sensor, and individually adjusting the depth of each sensor based on the measured environmental factors.

19. A computer program product stored on machine readable media for generating corrected geologic depth information by executing machine implemented instructions, the instructions for:

estimating a depth of each of a plurality of different locations along a length of a drillstring disposed in a borehole;

measuring at least one environmental factor at each of the plurality of different locations and determining a deformation of the drillstring at each of the plurality of different locations from the measured environmental factor; and generating a non-linear model of the deformation along the length relative to a reference point.

20. The computer program product of claim 19, wherein generating the non-linear model includes identifying a known depth of each of the plurality of different locations, measuring the at least one environmental factor at each location, and individually adjusting the depth of each location based on the measured environmental factors.

* * * * *